April 25, 1967   W. W. WOODS   3,316,486

EXTENDED RANGE MUTUAL INDUCTANCE DISTANCE GAUGE

Original Filed Sept. 12, 1963

(1) $e = \omega i (M_1 - M_d)$
(2) SERVO FUNCTIONS TO KEEP $e$ CONSTANT
(3) $\therefore \omega i = \dfrac{K}{M_1 - M_d}$
(4) MEASURING $\omega i$ GIVES MEASURE OF $\dfrac{1}{M_1 - M_d}$

INVENTOR.
WEIGHTSTILL W. WOODS

BY
Reynolds & Christensen
ATTORNEYS

United States Patent Office 3,316,486
Patented Apr. 25, 1967

3,316,486
EXTENDED RANGE MUTUAL INDUCTANCE
DISTANCE GAUGE
Weightstill W. Woods, Redmond, Wash., assignor to The
Boeing Company, Seattle, Wash., a corporation of
Delaware
Continuation of application Ser. No. 308,435, Sept. 12,
1963. This application June 9, 1966, Ser. No. 561,671
4 Claims. (Cl. 324—34)

This application is a continuation of Ser. No. 308,435 filed Sept. 12, 1963, now abandoned.

The present invention relates to improved gauging devices of the non-contacting type for measuring distance of separation between a selected measurement location and a conductive surface adjacent thereto. More specifically, an object of this invention is to provide a mutual inductance type gauging device achieving substantial linearity in the relationship between output response of the circuit and varying values of distance being measured over a much greater range of distances than was obtainable with prior mutual inductance gauges. The invention is herein illustratively described by reference to the presently preferred embodiment thereof; however, it will be recognized that certain modifications and changes therein with respect to details may be made without departing from the essential features involved.

A further object hereof is a mutual inductance gauging device providing measurements which are inherently corrected for circuit drift.

This invention is based on the discovery or observation that the reciprocal of the difference between mutual inductance of the sensing transformer coils (influenced by the surface the distance to which is being measured) and the mutual inductance of a reference transformer (uninfluenced by the surface), expressed as $$\frac{1}{M_1 - M_d}$$

is linear over a much greater range of distance than is the direct function of sensing transformer mutual inductance $M_d$ alone. As herein disclosed a reference transformer of constant mutual inductance is connected with its primary in series with the primary coil of the sensing transformer and with its secondary in series with the sensing transformer secondary coil, so as to derive a signal proportional to the difference between the mutual inductances of the two transformers. Variations in this difference signal from a predetermined reference value are utilized as error signals applied to a servo-amplifier loop which controls alternating current drive applied to the two primaries so as to maintain the difference signal at a constant value. In so doing, such drive current becomes inherently proportional to the desired reciprocal of the difference between mutual inductances as previously mentioned and is a measure of distance D. It will be seen that the servo-amplifier loop compensates automatically for circuit drift (i.e. variations in driver current frequency or amplitude) inasmuch as any change in the $\omega_1$ product producing a change of net output voltage from the transformer secondaries is automatically reduced to zero by feedback operation of the loop.

These and other features, objects and advantages of the invention will become more fully evident from the following description thereof by reference to the accompanying drawings.

Figure 1:
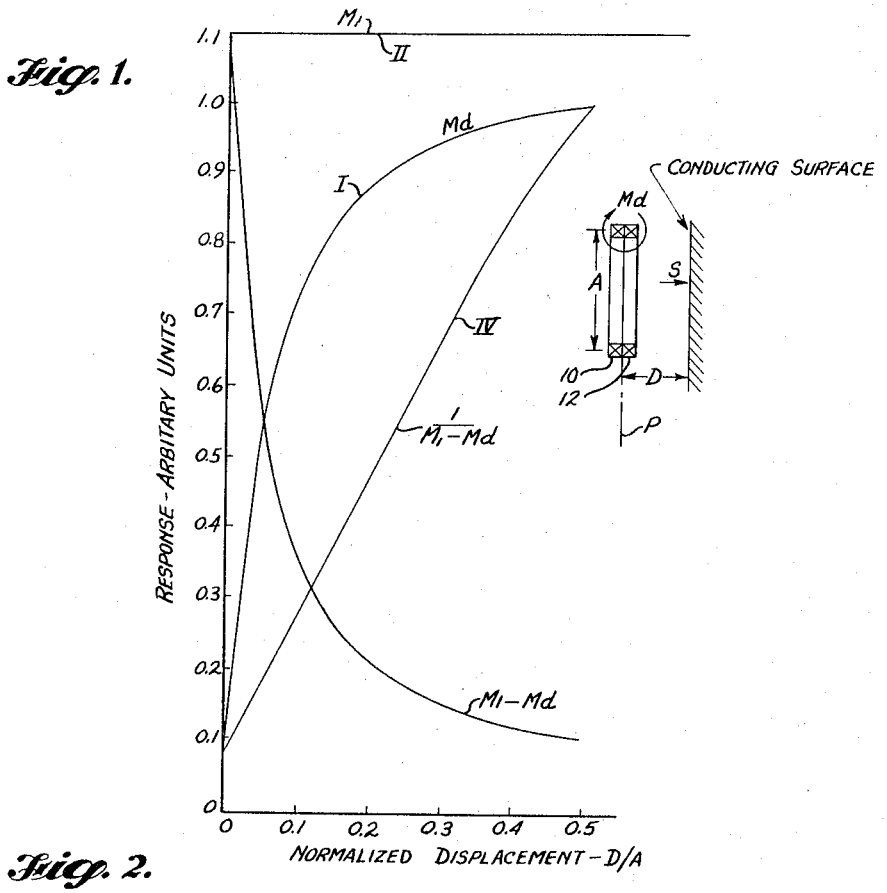
FIGURE 1 is a graphic diagram showing the relationship of variables involved in the derivation of distance D in the manner of the invention.

As shown in FIGURE 1 curve I represents the variation of mutual inductance $M_d$ between the two mutually congruent circular loops coils as a function of distance D (normalized for sensing transformer coil diameter A) separating them from a conductive surface S. It will be seen that this curve is approximately linear over a short range of distance variation, and for some applications this degree of linearity is sufficient so that measurement of mutual inductance directly affords an adequately precise measure of the distance D. Companion patent application Ser. No. 308,436 filed Sept. 12, 1963 now Patent No. 3,243,992 by the present inventor ("Gauging Device") discloses a system for the precise measurement of mutual inductance, hence of distance, in such a case. However, in accordance with the present invention substantially linear measurement of distance D over a much (several-fold) wider range is made possible by utilizing as the basis of measurement the reciprocal of the difference between sensing transformer mutual inductance $M_d$ and the mutual inductance $M_1$ of a reference transformer which is uninfluenced by the surface S. These relationships are illustrated in FIGURES 1 and 2.

Figure 2:
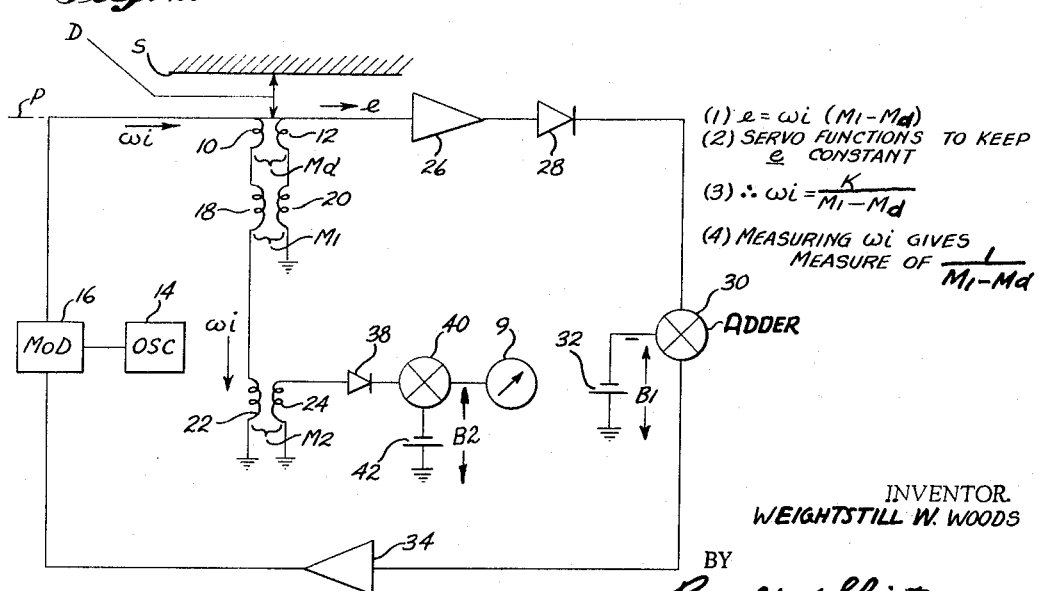
FIGURE 2 is a schematic diagram illustrating the preferred embodiment.

As shown in FIGURE 2, the sensing transformer primary 10 is inductively coupled to sensing transformer secondary 12, substantially congruent therewith, through mutual inductance $M_d$ which is related in the above-described manner to the distance D separating the coils (i.e. in measurement plane P) from surface S. Primary 10 is energized by the output of continuous-wave oscillator 14 through a modulator 16 by which the oscillation amplitude is controlled. Output voltage induced in the secondary 12 is thereby made proportional to $M_d\omega_i$, where $\omega$ is $2\pi f$ ("$f$" being oscillator frequency), and where $i$ is drive current applied to the coil. This same drive current is applied to the primary 18 of a reference transformer having its secondary 20 connected serially with the secondary 12, and also to the primary 22 of a third (output) transformer having a secondary 24. The respective mutual inductances $M_1$ and $M_2$ of the sensing transformer and output transformer are constant (i.e. unaffected by the distance D to surface S).

Serially connected secondaries 12 and 20 provide an algebraic difference signal $M_1\omega_i - M_d\omega_i$ which is applied to the input of amplifier 26 and rectifier 28. The resulting proportional direct current signal is applied to the input of adder 30 wherein it is added algebraically to a constant reference voltage $B_1$ from source 32 applied to a second input of the adder 30. The resultant difference signal produced by adder 30 is amplified in amplifier 34 and applied as a control signal to modulator 16 with such polarity as to reduce the value of the difference signal toward zero. In effect, therefore, the elements 10, 18, 12, 20, 26, 28, 30, 34 and 16 comprise a servo-loop which functions to maintain the input voltage applied to amplifier 26 (i.e. the combined output of secondaries 12 and 20) at a constant value, related to constant reference voltage $B_1$.

The difference voltage developed by the serially connected secondaries 12 and 20 is expressed as follows:

$$e = e_1 - e_2 = \omega_i M_1 - \omega_i M_d$$

The value $e$ is regulated at a constant value by the aforementioned feedback loop, so that, as indicated in FIGURE 2, $$\omega_i = \frac{e}{M_1 - M_d} = \frac{k}{M_1 - M_d}$$

where $k$ is a constant.

In order to indicate distance D directly on a meter 9 the output of output transformer secondary 24 (i.e. the value of $\omega_i$) is detected in rectifier 38 and applied to one input of the adder 40 for subtraction from a constant reference voltage which corrects for the fact that the curve of measurement (FIGURE 1) does not start at zero when D is zero.

Now, should the frequence ($\omega$) or amplitude ($i$) of oscillator 14 drift, there will be a resultant change in the net output $e$ from secondaries 12 and 20 causing a compensative correction in the drive level applied to modulator 16 by amplifier 34 tending to restore the $\omega i$ product to its original value. In effect, therefore, the system is inherently stabilized against the effects of circuit drift while being linearly responsive over a wide range to variations in distance D to be measured.

These and other aspects of the invention, together with modifications permitted therein, will be apparent to those skilled in the art, based on the foregoing disclosure of the presently preferred embodiment thereof.

I claim as my invention:

1. Means for gauging distance D from a measurement location to a conductive surface, comprising a sensing transformer having primary and secondary sensing coils which in use are positioned at the measurement location, whereby their mutual inductance is related to distance D, a reference transformer comprising primary and secondary coils having a constant mutual inductance, drive means for applying alternating driver current to said primary coils in series, said secondary coils being serially connected whereby to produce a resultant output voltage proportional to the difference between said mutual inductances multiplied by the product of driver current and driver current frequency, feedback loop circuit means including said drive means and operable in response to deviations of said resultant output voltage from a predetermined constant value whereby to regulate said resultant output voltage at a substantially constant value by control of said drive means, whereby the product of driver current and driver current frequency is made proportional to the reciprocal of the difference between said mutual inductances, and indicator means for measuring the output of said drive means.

2. The gauging means defined in claim 1, wherein the indicator means comprises an output transformer having primary and secondary coils, with the primary thereof being connected serially with the other primaries, a source of reference voltage, adder means connected for combining the output of said output transformer secondary and the last-mentioned source subtractively, and a meter connected to indicate the output of said adder means.

3. A mutual inductance distance gauge including a sensing transformer having primary and secondary coils the mutual inductance of which varies with distance to a conductive surface, a reference transformer having a primary coil connected serially with said sensing transformer primary coil and having a secondary coil connected serially with said sensing transformer primary coil, and drive circuit means connected to respond to the difference between outputs of said secondaries and connected to energize said primaries so as to maintain such difference substantially constant, and indicator means responsive to the energizing current applied to the primaries.

4. A mutual inductance distance gauge including a sensing transformer having primary and secondary sensing coils the mutual inductance of which varies with distance to a conductive surface, a controllable source of alternating current applied to said primary coil, means for deriving a control signal proportional to the difference between secondary coil output voltage and an independent voltage proportional to the product of said alternating current and the frequency of such current, feedback circuit means for controlling said source in response to said control signal in order to maintain said signal at substantially constant value, and indicator means connected to be responsive to said alternating current for determining the value of distance.

No references cited.

WALTER L. CARLSON, *Primary Examiner.*

R. J. CORCORAN, *Assistant Examiner.*